(12) United States Patent
Bedingfield, Sr.

(10) Patent No.: US 8,384,753 B1
(45) Date of Patent: Feb. 26, 2013

(54) MANAGING MULTIPLE DATA SOURCES

(75) Inventor: James Carlton Bedingfield, Sr., Lilburn, GA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 1594 days.

(21) Appl. No.: 11/611,795

(22) Filed: Dec. 15, 2006

(51) Int. Cl.
H04N 7/14 (2006.01)

(52) U.S. Cl. .................... 348/14.01; 348/14.07

(58) Field of Classification Search ............ 348/14.07, 348/14.01, 14.08, 14.09; 379/93.07, 93.17, 379/90.01
See application file for complete search history.

(56) References Cited

U.S. PATENT DOCUMENTS

| | | |
|---|---|---|
| 5,850,606 A | 12/1998 | Bedingfield, Sr. |
| 6,226,681 B1 | 5/2001 | Koga et al. |
| 6,598,075 B1 | 7/2003 | Ogdon et al. |
| 6,608,888 B2 | 8/2003 | Bedingfield et al. |
| 6,628,761 B1 | 9/2003 | Adamczyk et al. |
| 6,633,633 B1 | 10/2003 | Bedingfield |
| 6,665,388 B2 | 12/2003 | Bedingfield |
| 6,681,257 B1 | 1/2004 | Patel et al. |
| 6,724,863 B1 | 4/2004 | Bedingfield |
| 6,757,274 B1 | 6/2004 | Bedingfield et al. |
| 6,810,113 B1 | 10/2004 | Bedingfield et al. |
| 6,842,506 B1 | 1/2005 | Bedingfield |
| 6,853,718 B1 | 2/2005 | Bedingfield, Sr. et al. |
| 6,879,683 B1 | 4/2005 | Fain et al. |
| 6,882,708 B1 | 4/2005 | Bedingfield et al. |
| 6,980,635 B2 | 12/2005 | Bedingfield et al. |
| 6,993,014 B2 | 1/2006 | Bedingfield et al. |
| 7,006,829 B2 | 2/2006 | Zhao et al. |
| 7,080,169 B2 | 7/2006 | Tang et al. |
| 7,095,834 B2 | 8/2006 | Bedingfield et al. |
| 7,103,168 B2 | 9/2006 | Bedingfield, Sr. et al. |
| 7,103,170 B2 | 9/2006 | Fain et al. |
| 7,127,051 B2 | 10/2006 | Bedingfield et al. |
| 7,136,460 B2 | 11/2006 | Bedingfield |
| 7,203,293 B1 | 4/2007 | Bedingfield |
| 7,233,656 B2 | 6/2007 | Bedingfield, Sr. |
| 7,257,212 B2 | 8/2007 | Bedingfield et al. |
| 7,274,784 B2 | 9/2007 | Bedingfield, Sr. et al. |
| 7,315,614 B2 | 1/2008 | Bedingfield, Sr. et al. |
| 7,352,855 B2 | 4/2008 | Bedingfield, Sr. et al. |
| 7,382,872 B2 | 6/2008 | Bedingfield |
| 7,388,949 B2 | 6/2008 | Contractor et al. |
| 7,389,089 B1 | 6/2008 | Nguyen et al. |
| 7,394,895 B2 | 7/2008 | Bedingfield et al. |
| 7,394,897 B1 | 7/2008 | Bedingfield, Sr. et al. |
| 7,403,768 B2 | 7/2008 | Bedingfield, Sr. et al. |
| 7,433,974 B2 | 10/2008 | Bedingfield, Sr. et al. |
| 7,450,945 B2 | 11/2008 | Bedingfield |
| 7,469,043 B1 | 12/2008 | McDonald et al. |
| 7,512,222 B2 | 3/2009 | Bedingfield et al. |
| 7,558,277 B2 | 7/2009 | Bedingfield, Sr. |
| 7,599,481 B2 | 10/2009 | Bedingfield |
| 7,609,820 B2 | 10/2009 | Bedingfield, Sr. |
| 7,623,646 B2 | 11/2009 | Bedingfield, Sr. |
| 7,627,819 B2 | 12/2009 | Bedingfield, Sr. |
| 7,640,507 B2 | 12/2009 | Bedingfield, Sr. |
| 7,646,856 B2 | 1/2010 | Bedingfield et al. |
| 7,664,244 B2 | 2/2010 | Bedingfield |

(Continued)

*Primary Examiner* — Stella Woo

(57) ABSTRACT

Devices for managing multiple data sources or networks are described herein. One such device may include a data source input module configured to input a plurality of signals, which may include video signals, from multiple local data sources. The device may further include an output module, which may receive the signals from the data source input module and output the signals onto a single display device.

17 Claims, 8 Drawing Sheets

U.S. PATENT DOCUMENTS

| | | |
|---|---|---|
| 7,669,051 B2 | 2/2010 | Redlich et al. |
| 7,676,753 B2 | 3/2010 | Bedingfield |
| 7,764,960 B2 | 7/2010 | McClung |
| 7,773,982 B2 | 8/2010 | Bishop et al. |
| 7,802,205 B2 | 9/2010 | Bedingfield |
| 7,809,013 B2 | 10/2010 | Waxman |
| 7,818,396 B2 | 10/2010 | Dolin et al. |
| 7,894,589 B2 | 2/2011 | Bedingfield, Sr. |
| 7,895,157 B2 | 2/2011 | Bedingfield, Sr. |
| 2002/0076022 A1 | 6/2002 | Bedingfield |
| 2002/0085542 A1 | 7/2002 | Bedingfield et al. |
| 2002/0085687 A1 | 7/2002 | Contractor et al. |
| 2002/0110227 A1 | 8/2002 | Bedingfield et al. |
| 2002/0143812 A1 | 10/2002 | Bedingfield |
| 2003/0165219 A1 | 9/2003 | Bedingfield et al. |
| 2003/0174814 A1* | 9/2003 | Diacakis .................. 379/80 |
| 2003/0231759 A1 | 12/2003 | Bedingfield, Sr. et al. |
| 2004/0101124 A1 | 5/2004 | Koch et al. |
| 2004/0110465 A1 | 6/2004 | Bedingfield et al. |
| 2004/0156492 A1 | 8/2004 | Bedingfield, Sr. |
| 2004/0174978 A1 | 9/2004 | Bedingfield et al. |
| 2004/0203798 A1 | 10/2004 | Bedingfield |
| 2004/0213393 A1 | 10/2004 | Bedingfield et al. |
| 2004/0228466 A1 | 11/2004 | Bedingfield, Sr. et al. |
| 2004/0229620 A1 | 11/2004 | Zhao et al. |
| 2004/0248560 A1 | 12/2004 | Bedingfield, Sr. et al. |
| 2004/0260604 A1 | 12/2004 | Bedingfield, Sr. |
| 2005/0034147 A1 | 2/2005 | Best, Jr. et al. |
| 2005/0041792 A1 | 2/2005 | Bedingfield, Sr. |
| 2005/0050460 A1 | 3/2005 | Bedingfield, Sr. |
| 2005/0053215 A1 | 3/2005 | Bedingfield, Sr. |
| 2005/0053223 A1 | 3/2005 | Bedingfield |
| 2005/0100143 A1 | 5/2005 | Bedingfield, Sr. |
| 2005/0152363 A1 | 7/2005 | Malik et al. |
| 2005/0198336 A1 | 9/2005 | Eytchison et al. |
| 2005/0232409 A1 | 10/2005 | Fain et al. |
| 2005/0259804 A1 | 11/2005 | Bedingfield |
| 2006/0003758 A1 | 1/2006 | Bishop et al. |
| 2006/0050857 A1 | 3/2006 | Bedingfield et al. |
| 2006/0059266 A1 | 3/2006 | Ludwig et al. |
| 2006/0126646 A1 | 6/2006 | Bedingfield, Sr. |
| 2006/0156242 A1 | 7/2006 | Bedingfield |
| 2006/0156255 A1 | 7/2006 | Bedingfield |
| 2006/0203620 A1 | 9/2006 | Bedingfield, Sr. |
| 2006/0221826 A1 | 10/2006 | Bedingfield, Sr. et al. |
| 2006/0222008 A1 | 10/2006 | Aaron et al. |
| 2006/0222015 A1 | 10/2006 | Kafka et al. |
| 2006/0224988 A1 | 10/2006 | Bedingfield, Sr. |
| 2006/0225106 A1 | 10/2006 | Bedingfield, Sr. |
| 2006/0251116 A1 | 11/2006 | Bedingfield, Sr. et al. |
| 2006/0256957 A1 | 11/2006 | Fain et al. |
| 2006/0282855 A1* | 12/2006 | Margulis .................. 725/43 |
| 2006/0294244 A1 | 12/2006 | Naqvi et al. |
| 2007/0064911 A1 | 3/2007 | Bedingfield, Sr. et al. |
| 2007/0101263 A1 | 5/2007 | Bedingfield, Sr. |
| 2007/0116249 A1 | 5/2007 | Bedingfield, Sr. et al. |
| 2007/0121806 A1 | 5/2007 | Bedingfield |
| 2007/0121868 A1 | 5/2007 | Bedingfield et al. |
| 2007/0121889 A1 | 5/2007 | Bedingfield et al. |
| 2007/0124414 A1 | 5/2007 | Bedingfield, Sr. et al. |
| 2007/0124499 A1 | 5/2007 | Bedingfield, Sr. et al. |
| 2007/0124500 A1 | 5/2007 | Bedingfield, Sr. et al. |
| 2007/0124597 A1 | 5/2007 | Bedingfield, Sr. |
| 2007/0206748 A1 | 9/2007 | Cassanova et al. |
| 2007/0206750 A1 | 9/2007 | Bedingfield |
| 2007/0208766 A1* | 9/2007 | Malik .................. 707/101 |
| 2007/0242817 A1 | 10/2007 | Bedingfield, Sr. |
| 2007/0256007 A1 | 11/2007 | Bedingfield, Sr. |
| 2007/0256008 A1 | 11/2007 | Bedingfield, Sr. |
| 2007/0256016 A1 | 11/2007 | Bedingfield, Sr. |
| 2007/0256030 A1 | 11/2007 | Bedingfield, Sr. |
| 2007/0263884 A1 | 11/2007 | Bedingfield, Sr. |
| 2007/0274491 A1 | 11/2007 | Bedingfield et al. |
| 2007/0297595 A1 | 12/2007 | Bedingfield, Sr. et al. |
| 2008/0095335 A1 | 4/2008 | Bedingfield et al. |
| 2008/0107251 A1 | 5/2008 | Bedingfield, Sr. et al. |
| 2008/0109823 A1 | 5/2008 | Whitfield et al. |
| 2008/0110991 A1 | 5/2008 | Bedingfield |
| 2008/0120556 A1 | 5/2008 | Bedingfield et al. |
| 2008/0159509 A1 | 7/2008 | Whitefield et al. |
| 2008/0226056 A1 | 9/2008 | Bedingfield |
| 2008/0261686 A1 | 10/2008 | Bedingfield |
| 2008/0273079 A1* | 11/2008 | Campbell et al. .......... 348/14.08 |
| 2009/0016516 A1 | 1/2009 | McDonald et al. |
| 2009/0016519 A1 | 1/2009 | Bedingfield, Sr. et al. |
| 2009/0088221 A1 | 4/2009 | Gilbert et al. |
| 2009/0132610 A1 | 5/2009 | Bedingfield, Sr. |
| 2009/0137298 A1 | 5/2009 | Bedingfield, Sr. et al. |
| 2009/0150425 A1 | 6/2009 | Bedingfield, Sr. |
| 2009/0232149 A1 | 9/2009 | Bedingfield, Sr. |
| 2009/0269025 A1 | 10/2009 | Bedingfield, Sr. et al. |
| 2009/0269027 A1 | 10/2009 | Bedingfield, Sr. et al. |
| 2009/0316866 A1 | 12/2009 | Bedingfield et al. |
| 2010/0058179 A1 | 3/2010 | Bedingfield, Sr. |
| 2010/0058246 A1 | 3/2010 | Bedingfield, Sr. |
| 2010/0067678 A1 | 3/2010 | Bedingfield, Sr. |
| 2010/0088610 A1 | 4/2010 | Bedingfield, Sr. |
| 2010/0138224 A1 | 6/2010 | Bedingfield, Sr. |
| 2010/0142693 A1 | 6/2010 | Bedingfield |
| 2010/0144310 A1 | 6/2010 | Bedingfield, Sr. et al. |
| 2010/0145890 A1 | 6/2010 | Donovan et al. |
| 2010/0179701 A1 | 7/2010 | Gilbert et al. |
| 2010/0216525 A1 | 8/2010 | Bishop et al. |
| 2010/0218223 A1 | 8/2010 | Simpson et al. |
| 2010/0235175 A1 | 9/2010 | Donovan et al. |
| 2010/0251147 A1 | 9/2010 | Donovan et al. |
| 2010/0281503 A1 | 11/2010 | DeLorme et al. |

* cited by examiner

1000 →

1002
RECEIVE DATA INCLUDING VIDEO DATA FROM A PLURALITY OF LOCAL DATA SOURCES, THE PLURALITY OF LOCAL DATA SOURCES COMPRISING ONE OR MORE FIRST LOCAL DATA SOURCES COUPLED TO A FIRST NETWORK AND ONE OR MORE SECOND LOCAL DATA SOURCES COUPLED TO A SECOND NETWORK THAT IS INDEPENDENT OF THE FIRST NETWORK

1004
OUTPUT A PORTION OF THE VIDEO DATA RECEIVED FROM THE ONE OR MORE FIRST LOCAL DATA SOURCES AND A PORTION OF THE VIDEO DATA RECEIVED FROM THE ONE OR MORE SECOND LOCAL DATA SOURCES ONTO A SINGLE DISPLAY DEVICE

FIGURE 10 ion, and be protected by the accompanying claims.
MANAGING MULTIPLE DATA SOURCES

BACKGROUND

Computer users perform a variety of tasks with the use of computing devices and the like. For instance, users may at times use a computer to perform work, surf the web, play games, or watch movies or the like. Some employers may, however, limit their employees' use of the employer's computers or networks. For example, employers may block access to non-work related web sites. This may cause some employee computer users to use multiple computers for multiple different tasks. For instance, an employee computer user may use a work computer or network to perform work, while using a personal computer to navigate the web. Using multiple computers, however, can prove to be confusing and spatially inefficient.

These problems may be exacerbated for a teleworking computer user. This is because a teleworking computer user may desire a reliable link into an employer's network, in addition to the ability to perform work-related and non-work related tasks on one or more computers. Currently, the teleworker only has the solution of keeping multiple computers and other desired electronics on her desk in order to accomplish all of her tasks. Again, this solution is less than ideal.

The description below addresses these and other shortcomings in the present art.

SUMMARY

Devices for managing multiple data sources or networks are described herein. One such device may include a data source input module configured to input a plurality of signals, which may include video signals, from multiple local data sources. The device may further include an output module, which may receive the signals from the data source input module and output the signals onto a single display device.

Another device may include computer-readable media having instructions for selecting, from multiple data source displays each outputted from a respective local data source and each located on a single display device, one of the multiple data source displays. Further instructions may include accessing the selected local data source to allow for use of the local data source, in response to the selecting of the local data source.

A method described herein may include receiving data, including video data, from multiple local data sources. These local data sources may include some first local data sources that couple to a first network and other second local data sources that couple to a second network that is independent of the first network. This method may also include outputting some or all of the video data received from both the first and second local data sources onto a single display device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTIONS OF THE DRAWINGS

The teachings herein are described with reference to the accompanying figures. In the figures, the left-most digit(s) of a reference number identifies the figure in which the reference number first appears. The use of the same reference numbers in different figures indicates similar or identical items.

FIG. 10 is a flow diagram that illustrates a process for managing data received from multiple local data sources.

DETAILED DESCRIPTION

Figure 1:
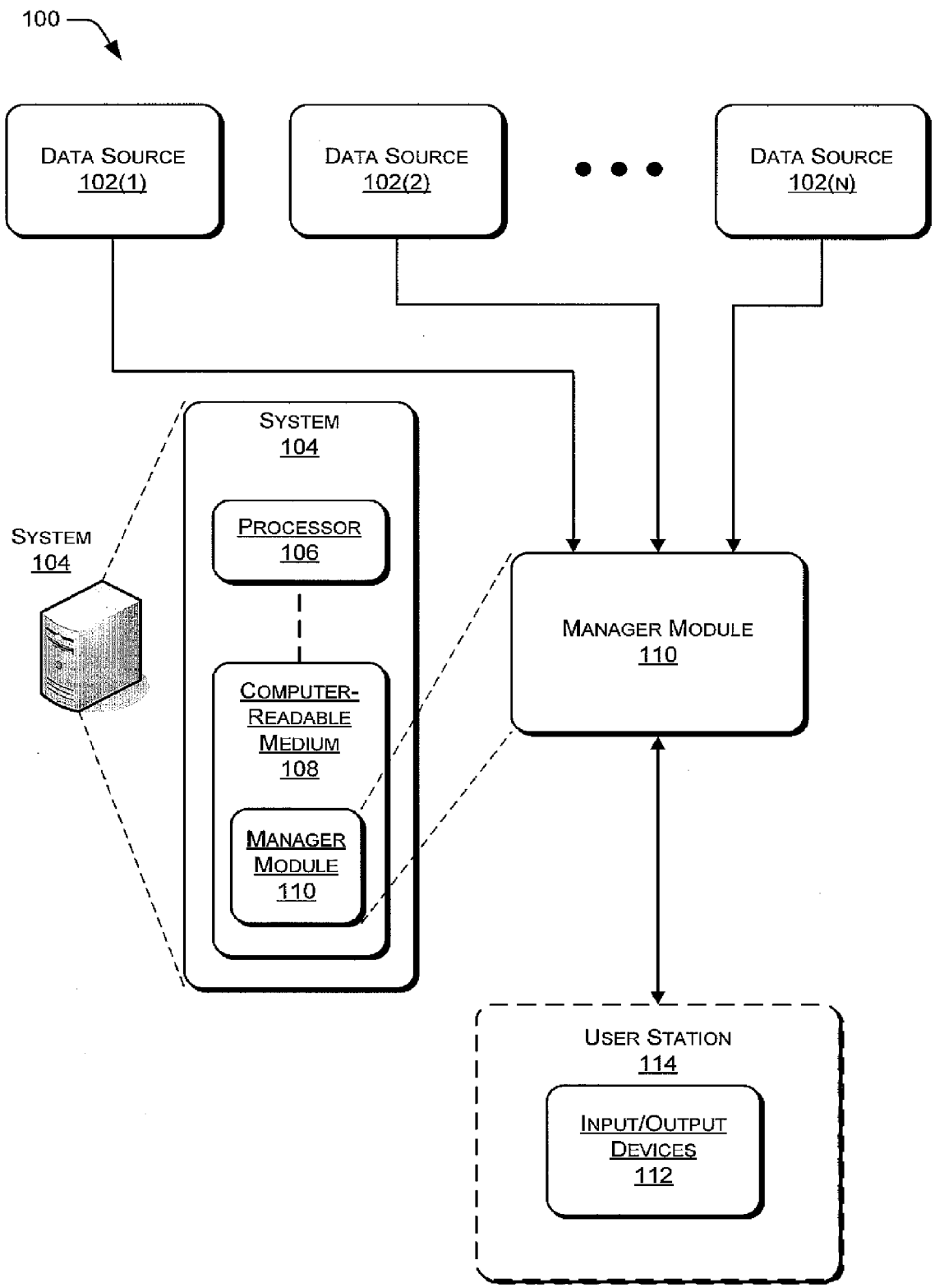
FIG. 1 is a block diagram of an overall environment in which a manager module may operate.

FIG. 1 illustrates an overall environment 100 in which a manager module 110 may operate. Data sources 102(1)-(N) may provide input in the form of data signals or the like to a system 104 and, hence, the manager module 110. System 104 may comprise a processor 106, upon which may run computer-readable medium 108 or the like. Computer-readable medium may comprise, in whole or in part, manager module 110. As illustrated, manager module 110 may be implemented as one or more software modules that, when loaded onto a processor and executed, cause the system to perform any of the functions described herein. Alternatively, manager module 110 may itself comprise hardware, such as a processor or the like. System 104 and/or manager module 110 may output these signals to one or more input and/or output devices 112. Data sources 102(1)-(N) may comprise a plurality of different devices. Illustrative but non-limiting examples include personal computers such as towers and laptops, server devices, personal digital assistants (PDA's), mobile telephones, land-based telephone lines, external memory devices, cameras, or any other suitable electronic device. In some implementations, data sources 102(1)-(N) may comprise local devices. For instance, if data sources 102(1)-(N) are "local data sources", they may be located locally to a user operating each respective device. These local data sources may receive data from and send data both locally and remotely. Input/output devices 112 may also comprise a plurality of electronic devices or the like, described in further detail with reference to FIG. 2.

In some implementations, input/output devices 112 may be located at a single user station 114. As such, manager module 110 may be configured to accept signal inputs from a plurality of data sources 102(1)-(N) and output those signals to single user station 114. In other implementations, devices 112 may be located at a multitude of locations, and may thus not comprise single user station 114. In any instance, the resulting system may thus comprise an environment capable of managing information to and from a plurality of data sources. As described in greater detail with reference to FIG. 2, the managed information may also comprise information from multiple networks, some of which may be independent from one another.

Figure 2:
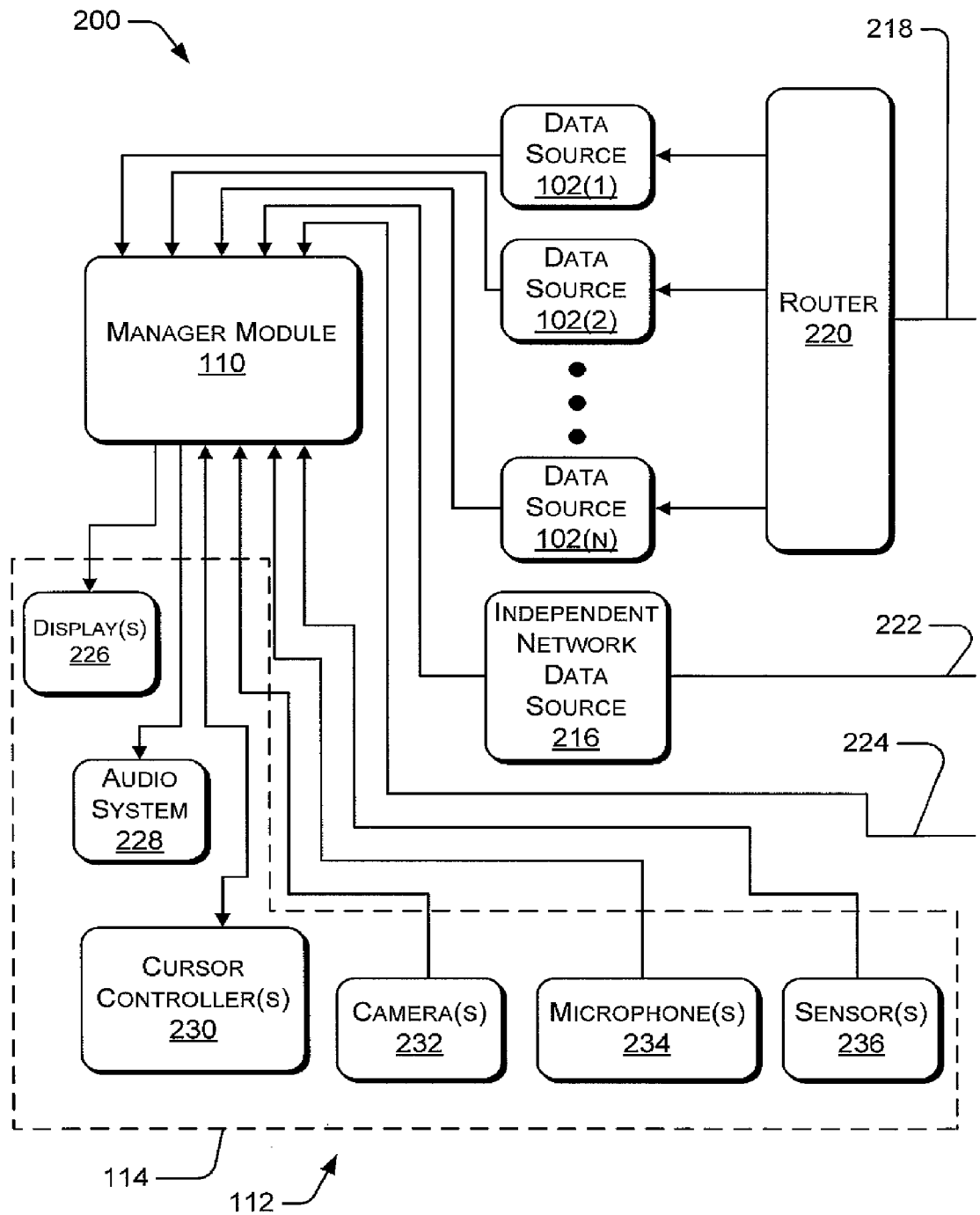
FIG. 2 is a block diagram providing further details of another overall environment in which a manager module may operate, relating to various types of input and output to and from the manager module.

FIG. 2 illustrates another environment 200 in which manager module 110 may operate. Environment 200 may comprise one or more data sources 102(1)-(N), manager module 110, input/output devices 112, and an independent network data source 216. Although the single independent network data source 216 is illustrated, it is to be understood throughout that a plurality of independent network data sources may exist. As illustrated, input/output devices 112 may again be located at single user station 114 in some implementations, and at a multitude of locations in other implementations. Data sources 102(1)-(N) may transmit data to and receive data from a plurality of networks, or the data sources may all transmit data to and receive data from the same network. In the illustrated but non-limiting embodiment, data sources 102(1)-(N) are shown to all transmit data to manager module 110 from a network 218. Network 218 may be a land-line telephone-based dial up connection, a digital subscriber (DSL) line, a cable-based network, a satellite network, or the like. As illustrated, network 218 may connect to a router 220, which may then connect to one or more of data sources 102(1)-(N).

Furthermore, data sources 102(1)-(N) may all be put to the same use or such uses may vary. For instance, in some implementations data source 102(1) may be used to carry broadband entertainment signals, while data source 102(2) may be used to connect a virtual private network (VPN) signal. The latter signal may be used, for example, to connect to a work account that requires relatively high security. Meanwhile, in some instances data source 102(N) may be used for a connection to the internet. The internet connection may be an open internet connection, as compared to some instances of the VPN connection over data source 102(2). Because the VPN connection may be used, in some instances, to connect to a work account or the like, the managing employer may limit internet access over the network. The open internet connection of data source 102(N) may remedy this limitation in some implementations.

As discussed in reference to FIG. 1, non-limiting examples of data sources 102(1)-(N) may include personal computers such as towers and laptops, server devices, personal digital assistants (PDA's), mobile telephones, land-based telephone lines, external memory devices, cameras, or any other suitable electronic device. For example, data source 102(1) may comprise a personal computer, which may be used to carry broadband entertainment signals as discussed above. Similarly, data source 102(2) may comprise a computer as well, with its purpose being to provide a VPN connection to a user's work account. Data source 102(N), meanwhile, may also comprise a personal computer, such as a laptop computer, with its purpose being to provide an open internet connection for the user's navigating convenience. In some instances such as the one described above, data sources 102(1)-(N) will each comprise a separate housing, although it is possible that more than one data source may occupy a single housing. Furthermore, while the above example depicts all of data sources 102(1)-(N) as computers, computers need not always be implemented.

An independent network data source 216 may also provide input signals to manager module 110. Independent network data source 216 may transmit and receive data via a network 222 that is independent of network 218. If multiple independent network data sources exist, then one or more such networks may exist. Due to the independence of network 222 from network 218, independent network 222 and thus independent network data source 216 may be relatively free from any problems or encumbrances that network 218 may experience. For instance, if network 218 congests or crashes, signals traveling via independent network 222 may be unaffected. Thus, the content itself of independent network data source 216 may be relatively more secure as compared to a data source that shares a network with other data sources. Similar to network 218, independent network 222 may comprise a land-line telephone-based dial up connection, a digital subscriber (DSL) line, a cable-based network, a satellite network, or the like.

Similar to data sources 102(1)-(N), independent network data source 216 may comprise a plurality of different devices. Such non-limiting examples may include personal computers such as towers and laptops, server devices, personal digital assistants (PDA's), mobile telephones, land-based telephone lines, external memory devices, cameras, or any other electronic device. In some implementations, however, independent network data source 216 may comprise devices that define a telepresence module. Such a telepresence module may operate to provide, to a local or remote location, audio and/or video signals of a user when that user is present at a certain location, such as user station 114. A telepresence module may also operate to receive audio and/or video signals from a remote or local location. When a user is present at the desired location, such as the user station 114, the telepresence module may automatically or manually activate.

Stated otherwise, this resulting telepresence module may serve as a reliable telepresence link between two or more locations. For instance, telepresence link could serve as a link between user station 114 comprised of input/output devices 112 and a user's place of work. This place of work may, in some instances, be the user's office located at his or her employer's building. This link may provide audio and/or video signals to the two or more locations, such as user station 114 and the user's office at work. As such, independent network 222 and independent network data source 216 may provide a reliable telepresence signal without concern for any congestion of failure that network 218 may encounter.

Furthermore, independent network 222 and independent network data source 216 may provide always-on point-to-point or point-to-multipoint connectivity. Such a reliable and always-on system may serve to avoid not only processor errors, discussed above by way of congestion and/or failures, but may also serve to avoid operational error by a user by simplifying the system. An always-on system may also avoid the possibility of a data source entering "sleep mode" at an undesirable time.

Environment 200 may also comprise a telephone line 224, which may also provide input signals to manager module 110. Telephone line 224 may be a traditional land-based telephone line, or it may comprise packet (IP), mobile or satellite technology. Signals from telephone line 224 may also output to some or all of input/output devices 112.

Input/output devices 112 may comprise one or more displays 226, an audio system 228, cursor controllers 230, cameras 232, microphones 234 and/or sensors 236. Input/output devices 112 may serve to input or output signals to or from data sources 102(1)-(N) or independent network data source 216. As illustrated, input/output devices 112 may be configured to connect to manager module 110. Furthermore, input/output devices 112 may be located in a plurality of locations, or in some implementations may be located at single user station 114. Some components may also serve more than one purpose, or a single device could comprise all or nearly all of input/output devices 112.

One or more displays 226 may receive and display video signals from data sources 102(1)-(N) and/or independent network data source 216. If displays 226 comprises a single display, then the video signals and hence data source displays may be displayed on the single display. This is discussed in detail below with reference to FIGS. 4-9. It is specifically noted that the term "single display device" does not require a single monitor but rather a system that gives a user the sensation of a single display. This may be accomplished by attaching multiple monitors or the like and giving each a portion of a video signal. When combined, the signals form a complete video display.

In some implementations, display 226 may comprise a cylindrical or spherical monitor, which may span approximately 180° around a user. Display 226 may comprise a liquid crystal display (LCD) screen or the like, or may comprise a projector screen. If display 226 comprises a projector screen, then input/output devices 112 may further comprise a projector for outputting video signals onto display 226. Alternatively, manager module 110 could itself comprise a projector. If the projector screen is cylindrical or spherical, the projector may be capable of spreading the data source displays across the screen, again as discussed in detail below.

As mentioned above, input/output devices 112 may also comprise one or more audio systems 228. Audio system 228 may comprise speakers or the like for outputting audio signals from data sources 102(1)-(N) and/or independent network data source 216. Audio system 228 may further comprise a multi-channel audio reproduction system, which may comprise an automated mixer(s), amp(s), headphones, or the like. An automated mixer may mix audio signals from a plurality of data sources as well as incoming telephone calls.

Input/output devices 112 may also comprise one or more cursor controllers 230. Cursor controllers may include, without limitation, a text input device such as a keyboard, a point-and-select device such as a mouse, and/or a touch screen. Input/output devices 112 may also include one or more cameras 232. Cameras 232 may comprise, for example, one or more video cameras. In some implementations, camera 232 may be configured for use with a telepresence module discussed above. For example, a video camera signal may capture the image of a user and provide the signal to manager module 110. Manager module 110 may then transmit the signal to one or more locations, one of which may be the user's work office. The transmitted video signal may be streaming in some instances, so that an image of a user is projected at all times at one or more locations, such as the user's work office. This image may, for example, be displayed on a display device at one or more locations such as the user's work office. Thus, with the use of the one or more cameras 232, the user may be able to work at a remote user station, such as user station 114, while the user's coworkers or superiors can view the user and his or her activities. Of course, teleworking is merely one example of an activity for which the one or cameras 232 may be put to use.

Input/output devices 112 may further comprise, in some instances, one or more microphones 234 or other multi-channel audio sensing equipment. Microphone 234 may be configured to provide audio input signals to manager module 110. For example, microphone 234 may be configured for use with the telepresence module discussed above. In this implementation, microphone 234 may be configured to capture audio signals from a user and provide these signals to manager module 110. Manager module 110 may then transmit these signals to one or more locations, one of which may again be the user's work office. The transmitted audio signal may be streaming, so that the sounds of the user are audible at one or more locations at all times. Also, microphone 234 may be noise-gated and set with a threshold value. This may be of particular importance in implementations with multiple microphones, so as to only send user-inputted audio signals from a certain microphone to manager module 110 when the user intends to do so. Microphone 234 may also act in conjunction with manager module 110 to enable voice recognition. In some implementations, these components may require that user's voice be recognized before allowing user to use microphone 234 and hence manager module 110.

Furthermore, implementations with multiple microphones may utilize stereophonic sound techniques. For instance, if a user conducts multiple videoconference and/or teleconference meetings simultaneously, the system may dedicate a microphone to each. As a result, if a user turns and speaks into a left microphone, a recipient represented on the data source display on the left may receive the sound at greater volumes. At the same time, the microphone on the right may receive less input and, hence, the recipient depicted in the data source display on the right may receive the sound at lesser volumes.

In the office example, microphone 234 could be coupled with camera 232 so as to provide the image and sounds of the user at the user's work office at all times. The user's work office may thus not only have a display depicting the user's image, but may also have one or more speakers to output the audio signals captured by microphone 234 and transmitted by manager module 110. Furthermore, in some instances the user's work office (or other exemplary locations) may contain one or more cameras, such as a video camera, and one or more microphones so that two-way audio and visual communication may occur between the office and the remote user station, such as user station 114.

In the teleworking example, this may provide adequate availability of the user in the office, despite the fact that user may be remotely situated. For example, a co-worker may be able to walk over to the user's work office and see that the user is working at a remote user station. The co-worker may confront a monitor or the like displaying the user at a remote user station. The co-worker may also be able to ask the user questions and like with use of the office microphone(s), and the two may be able to communicate as efficiently or nearly as efficiently as if the user were physically present at the work office. Furthermore, while this telepresence link may be secure, it may also be accessible by others. A user's boss, for instance, may be able to bridge into the telepresence signal rather than have to walk to the user's work office to communicate to the user.

Output/input devices 112 may further comprise one or more sensors 236. Sensor 236 may, in some instances, sense when a user is present at a user station, such as user station 114. In some implementations, sensor 236 may comprise a weight-based sensor that may be configured to situate adjacent to or integral with a user's chair. Thus, in some instances when a user sits down on his or her chair, sensor 236 may detect that the user is present. Furthermore, sensor 236 may be capable of differentiating between users. In the weight-based sensor example, sensor 236 may be capable of differentiating between a first user (User #1) and a second user (User #2) based on each user's weight. It is noted, however, that other sensors are envisioned. For example, camera 232 may serve to sense when a user is present, as may microphone 234.

Furthermore, sensor 236 may collect various pieces of information, which may use to determine the presence of a user. Sensor 236 may also store and/or log this collected information. For instance, sensor 236 may collect information such as the weight or height of a user, as well as other user-specific data. Furthermore, sensor 236 may gather the time of when certain data was collected. In some implementations, sensor 236 may calculate and save the amount of time that a user spent at the user station, as well as the amount of time that the user was away. This collected information may be provided only the user, or it could be available by others, such as the user's boss in the teleworking examples.

Along with sensor 236, input/output devices 112 may also collect various pieces of information. For instance, camera 232 may collect location information pertaining to a present user. Similarly, microphone 234 may collect information regarding the sounds emanating from the present user. Sensor 236, camera 232, microphone 234, and other input/output devices 112 may not only collect the actual content of the user's actions, but may also collect the "recipe" of the content of the user's actions. These devices may create a chronological list of events that comprise the user's actions, which may be sent to remote locations for synthesis. Using this events list or recipe, remote locations may synthesize the user's actions. This may apply to audio, video, smell or any other characteristic that may be present at user station 114 or the like. While this synthesis may not be as real as if the remote location merely receives and displays streaming video, audio, or the like, the size of the file transporting this information may be orders of magnitude smaller.

For instance, such a chronological events list created by various pieces of information collected by input/output devices 112 may look like the following:

At time 21:27:06 GMT, 28 Nov. 2006; weight sensor reading=151.5 pounds; audio amplitude=13.7 decibels; audio content="I'm working from home today" using Bob Jones' voice font; playback rate=7 words per minute; video content=Bob Jones in chair, display cartoon face item #47 for 50 milliseconds At time 21:27:08 GMT, 28 Nov. 2006; weight sensor reading 000.3 pounds; audio amplitude=0.0 decibels; video content=empty chair, display empty chair At time . . . .

As discussed above, this events list may be transmitted to remote locations, which may then synthesize the content according to the recipe. Using the above events list, for example, the remote location may initially show a cartoon face or the like of a generic man, or a more realistic picture of "Bob Jones". The remote location system, such as a computer at the user's work, may also project a voice, and possibly Bob's voice, that says "I'm working from home today". The projected voice may be approximately equal to the volume spoken by Bob, and may also be approximately equal to the words' spoken cadence. Furthermore, at time=21:27:08 GMT, the remote location may display an empty chair representing that Bob is no longer present at user station 114. Such an events list may serve to decrease file size being sent along the networks while still maintaining a realistic experience at the remote location.

Sensor 236 may also serve other purposes. In some implementations, sensor 236 may adjust the sizes of data source displays or data source display windows, discussed in detail below, depending on a current angle of rotation of a user's chair. Sound volumes emanating from different data source displays may also be adjusted based on chair rotation, as may microphone volumes. For instance, if a user's chair is currently rotated to the left, insinuating that user's attention currently focuses on the data source display to the left, the volume of that data source may be increased, as may be the window size. It is also envisioned that sensor 236 could make other similar adjustments in this manner.

Furthermore, in some implementations, sensor 236 may cause one or more of data sources 102(1)-(N) and/or independent network data source 216 to turn on or off, or perform one or more other functions. In the implementation of the weight-based chair sensor, sensor 236 may cause a telepresence module to turn on when a user sits in his or her chair. This may thereby establish a reliable telepresence link. Again, in some implementations this could automatically turn on a telepresence link to a work office, which may comprise turning on a display, camera, and/or microphone at the work office. In this implementation, sensor 236 may also notify others located at the work office (or other exemplary location) when the user has stepped out of the remote user station, such as user station 114. When the user gets up from his or her chair, for instance, the work office display may present an away message indicating that the user has recently left the user station, but may soon return. Furthermore, sensor 236 may recognize users in order to automatically provide user preferences tailored to the detected user. These user preferences may comprise audio or video preferences or the like, which may be comprised of the different audio and video capabilities discussed below.

As noted above, telephone line 224 may input to manager module 110. Thus, input/output devices 112 may comprise a telephone. Also, some or all of input/output devices 112 described above may serve telephone functionality over telephone line 216. For instance, audio system 228 may output sound from telephone line 224, while microphone 234 may input audio signals into telephone line 216. Furthermore, display 226 may exhibit a video signal transmitted over telephone line 224, such as for a video teleconferencing call. Camera 232 may accordingly also provide video signals, such as of the image of the user, over telephone line 224. Other components may be included to achieve full telephone capabilities, such as a speakerphone, a headset, a handset, or the like.

Figure 3:
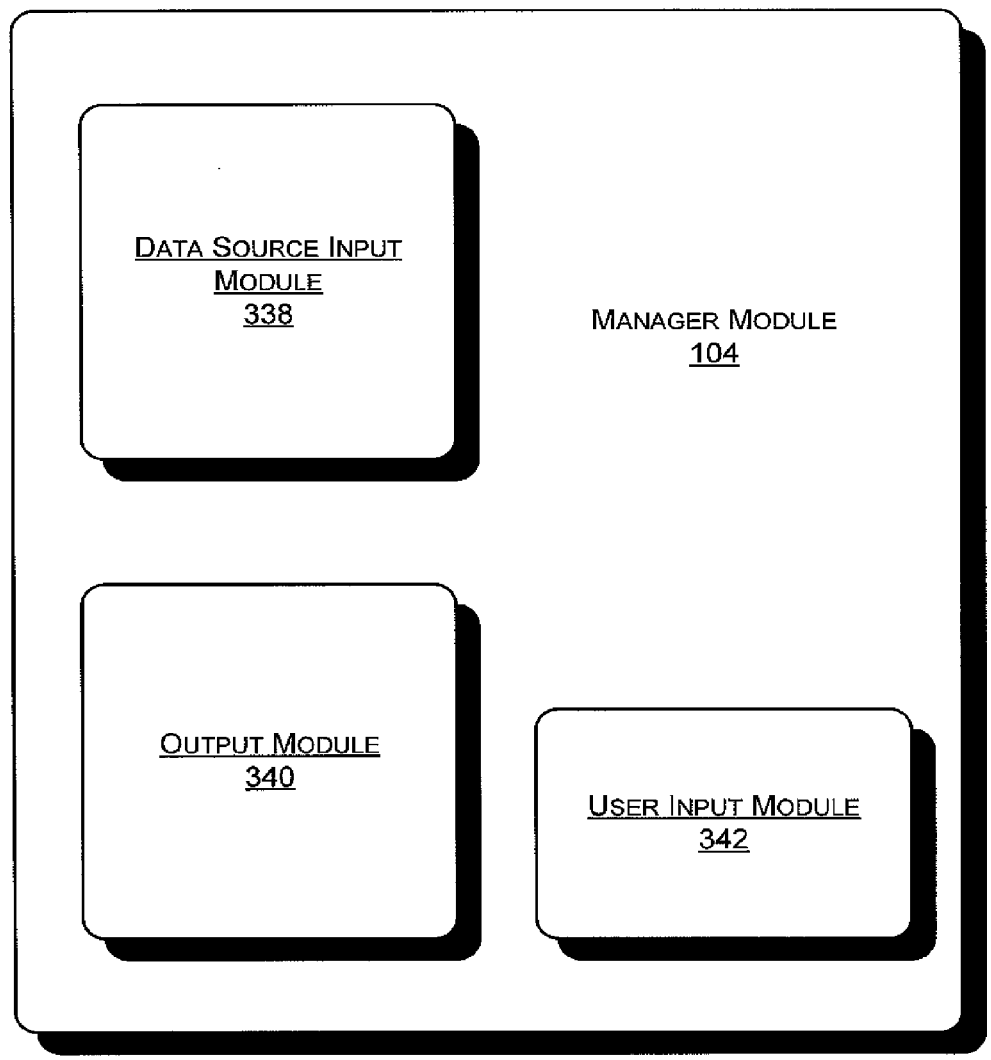
FIG. 3 is a block diagram of illustrative components of a manager module.

FIG. 3 depicts a block diagram of illustrative components of manager module 110. Manager module 110 may comprise a data source input module 338, an output module 340 and a user input module 342. Data source input module 338 may be configured to receive a plurality of signals from data sources 102(1)-(N). The plurality of signals may comprise video and audio signals. In one implementation, the plurality of signals may comprise a telepresence signal as described above. Output module 340 may be configured to receive the plurality of signals from data source input module 338 and output the signals to input/output devices 112. In some instances, output module 340 may be configured to output video signals to one or more displays 226. For instance, output module 340 may output the video signals to a single display 226. Furthermore, output module 340 may be configured to output audio signals to audio system 228. In one implementation, output module 340 may be configured to output audio signals from data sources 102(1)-(N) to a single speaker or set of speakers. In this case, the system may further be capable of managing sound volumes and other respective characteristics of audio signals coming from discrete data sources 102(1)-(N).

As mentioned above, manager module 110 may include user input module 342, which may be configured to receive user input signals or other user instructions. In some instances, user input module 342 may be configured to receive input from one or more of the one or more cursor controllers 230, cameras 232, microphones 234, and/or sensors 236. Signals received from cursor controller 230 may, for example, be received for the purpose of accessing a data source or modifying, activating or using a program or application running on a data source. User input module 342 may also be configured to receive signals from camera 232, which may comprise images (e.g. video images) of a user located at user station 114. Similarly, user input module 342 may receive user-inputted audio signals from microphone 234. User input module 342 may further be configured to receive signals from sensor 236, which may, in some instances, serve to indicate that a user is present at user station 114. For instance, user input module 342 may receive a signal from sensor 236 indicating that a user is sitting in the user station chair and/or facing a certain direction as discussed above. All of the afore-mentioned signals may be relayed from user input module 342, and hence manager module 110, and to the respective data source 102(1)-(N) or independent network data source 216 destination.

Figure 4:
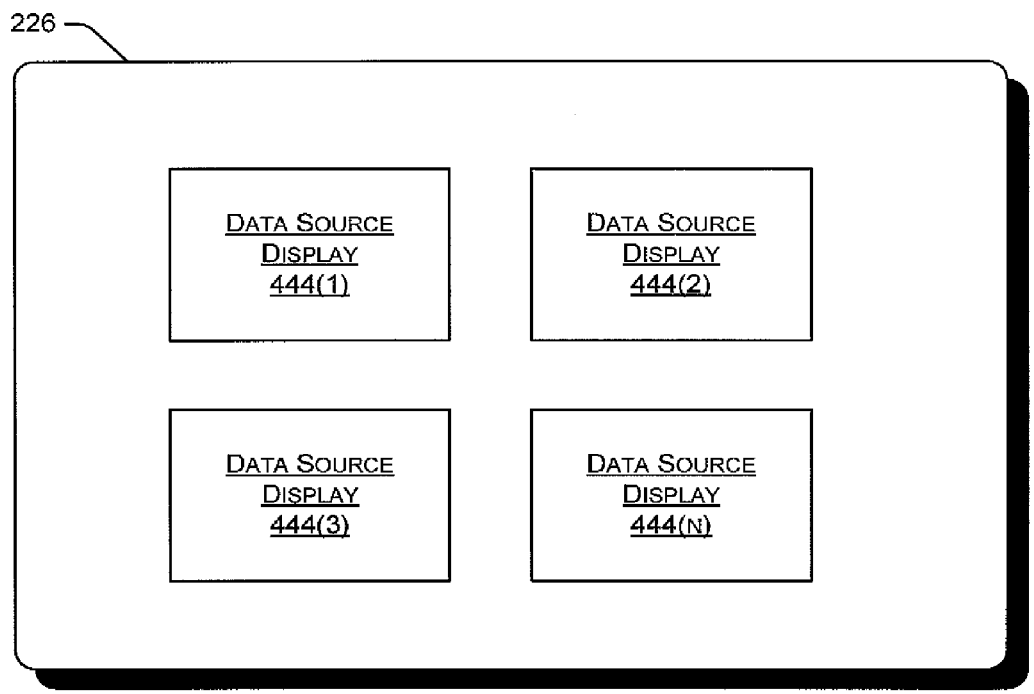
FIG. 4 is a block representation of a display device upon which a manager module may output a plurality of data source displays.

Turning next to FIG. 4, in some implementations manager module 110 and its output module 340 may output video signals from one or more data sources 102(1)-(N) to a single display. Video signals from data sources 102(1)-(N) may define data source displays 444(1)-(N). For instance data source display 444(1) may represent video signals corresponding to data source 102(1), and so on. As such, manager module 110 may be configured to output or project a plurality of data source displays 444(1)-(N) to a single display device 226. In the illustrated implementation of FIG. 4, four data source displays are depicted.

Figure 5:
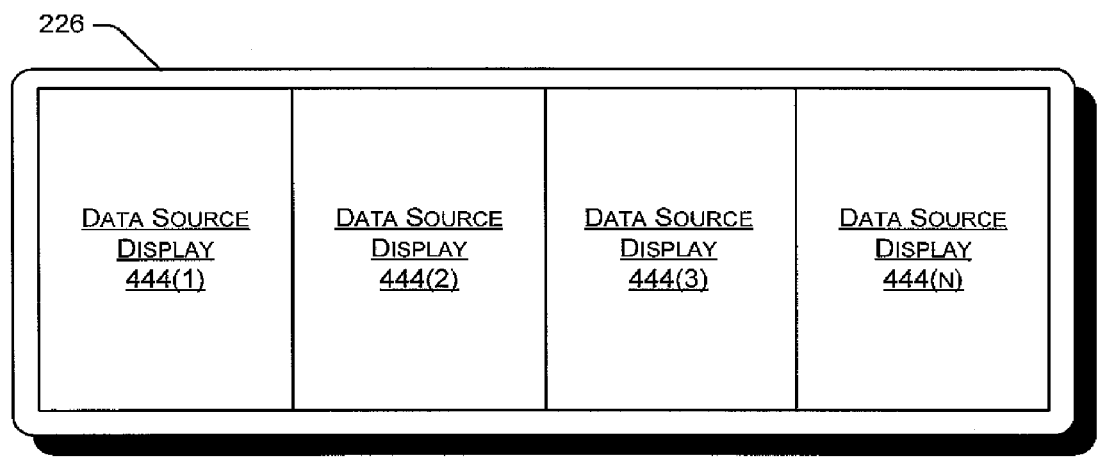
FIG. 5 is another block representation of a display device upon which a manager module may output a plurality of data source displays.
Figure 6:
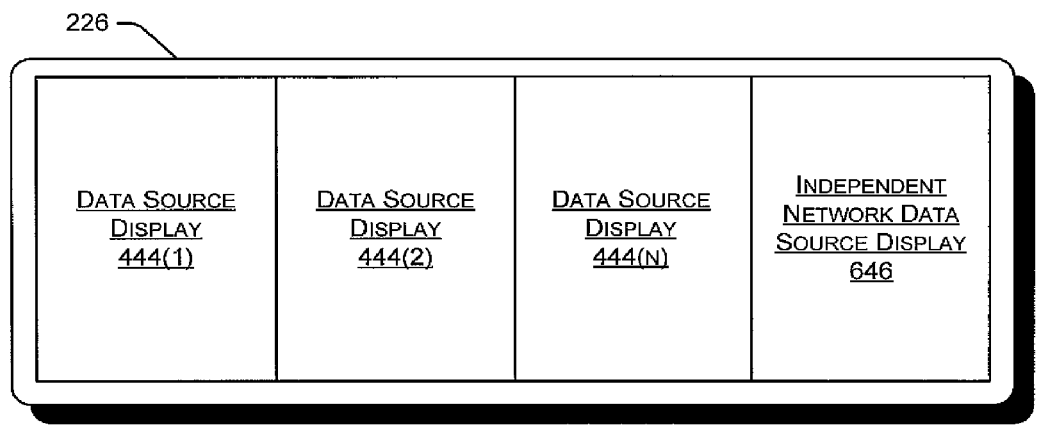
FIG. 6 is another block representation of a display device upon which a manager module may output a plurality of data source displays as well as an independent network data source display.

FIG. 5 depicts a manner in which a plurality of data source displays 444(1)-(N) may be arranged on the single display device 226. As illustrated, data source displays 444(1)-(N) may be aligned adjacent to one another and may be displayed in equal proportions. Manager module 110 may be further configured to output video signals of independent network data source 216 onto the single display device 226. Video signals of independent network data source 216 may define an independent network data source display 646. The independent network data source display 646 may comprise video images taken at another location by detection means such as one or more cameras, as discussed above. Also as described above, this location may be a work office or the like. As such, a user observing display 226 may be able to see his or her work office from a user station, such as user station 114, containing input/output devices 112. In any event, manager module 110 may, in some instances, output one or more data source displays 444(1)-(N) as well as independent network data source display 646 on a single display, such as the single display device 226. Furthermore, the data source displays 444(1)-(N) and 646 may be arranged adjacent to one another and in equal proportions, as depicted in FIG. 6.

Figure 7:
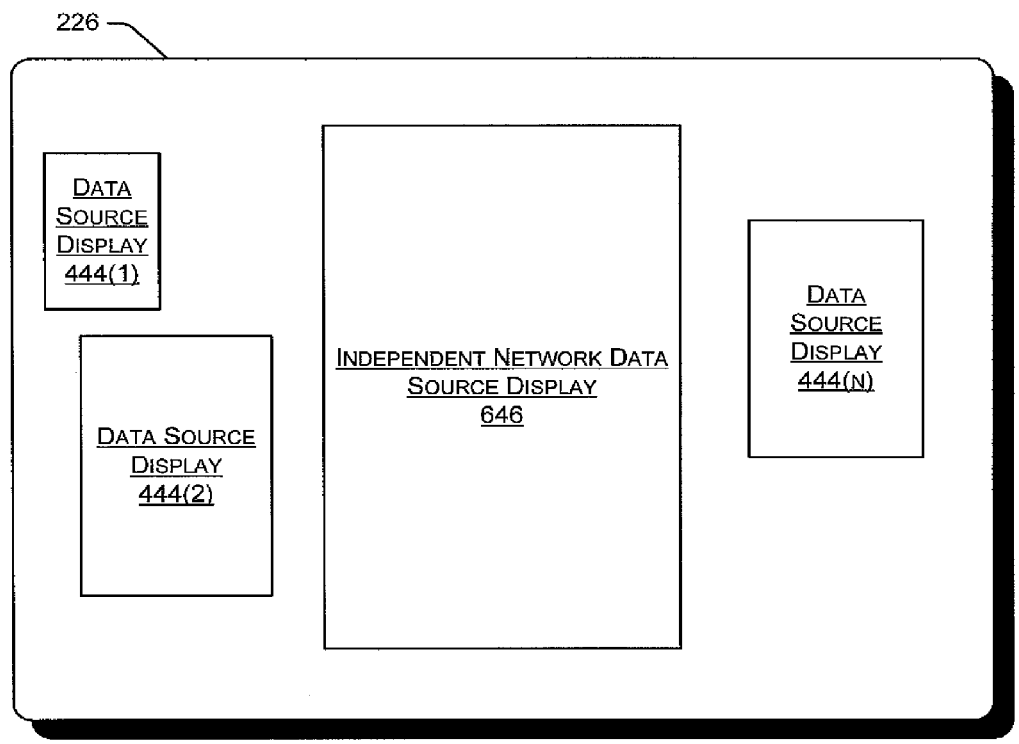
FIG. 7 is another block representation of a display device upon which a manager module may output a plurality of data source displays as well as an independent network data source display.

Data source displays 444(1)-(N) and/or independent network data source display 646, however, need not be arranged with such uniformity. Reference is thus made to FIG. 7, which depicts an alternative arrangement of the data source displays 444(1)-(N) and 646. In the illustrated and non-limiting example, a user may decide to focus his or her attention mostly upon independent network data source display 646 (or other data source displays 444(1)-(N)). As such, the user may arrange the display 646 in the middle of display 226 and may also choose to enlarge the display 646. Conversely, the user may decide that the current importance of data source display 444(1) is minimal, and may accordingly move the display 444(1) away from the middle of a screen of display 226. In the 180° cylindrical display implementation discussed above, the user may choose to slide the display 444(1) all the way adjacent to the user's left ear, for instance. Note also that, as illustrated, the user may lessen the size of data source display 444(1) as well. Other data source displays 444(2)-(N) may likewise be arranged by location and size. Furthermore, the user may also be able to modify resolutions of the displays and manager module 110 may be capable of providing such modification.

Returning to the example discussed above, data source 102(1) may comprise a personal computer, which may be used to carry broadband entertainment signals. Similarly, data source 102(2) may comprise a computer as well, with its purpose being to provide a VPN connection to a user's work account. Data source 102(N), meanwhile, may also comprise a personal computer, such as a laptop computer, with its purpose being to provide an open internet connection for the user's navigating convenience. Furthermore, independent network data source 216 may comprise a telepresence signal so that a user may work at a remote user station, such as user station 114, while broadcasting audio and/or video signals to the user's work office, for instance.

Now merging this implementation with FIG. 7, it may be that the user becomes more focused on work than the other tasks being accomplished by data sources 102(1)-(N). Thus, as discussed immediately above, the user may enlarge and center independent network data source display 646. Meanwhile, the user may be watching video from CNN® (CNN® is a registered trademark of Cable News Network, LP) or the like and may choose to lessen this data source display 444(1) and move it away from the center of display 226. Similarly, the user may be accessing a spreadsheet from a work database via the VPN from data source 102(2). At this moment, however, the user may again decide to focus on independent network data source display 646 and may thus decide to lessen data source display 444(2) as well as move it away from the center of display 226. In this example the user may also be surfing the internet with the use of the open internet connection provided by data source 102(N). Again, the user may choose to divert his or her attention from this data source display 444(N) by lessening its size and placing it in a less noticeable location. The user may also decide to provide high resolution to independent network data source display 646. Conversely, the user may choose to lessen a resolution of data source display 444(1) or other data sources.

Figure 8:
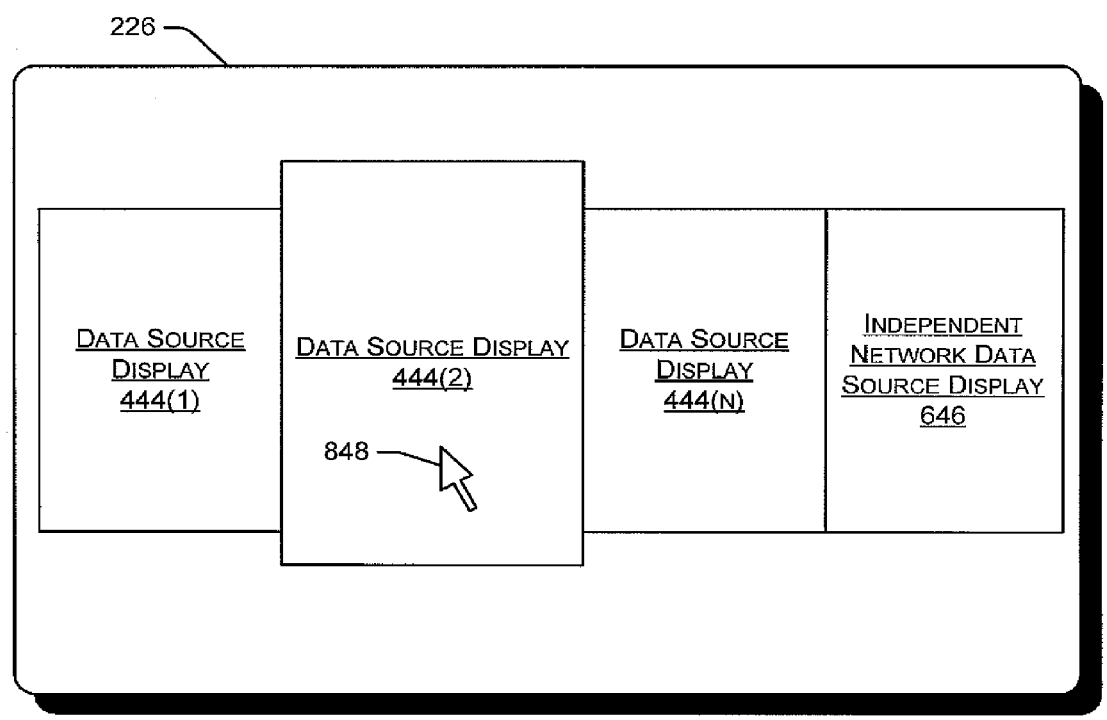
FIG. 8 is a block representation of a display device upon which a manager module may select and access one of a plurality of data source(s) and/or independent network data source(s).

If manager module 110 is to have the capability to dynamically, select, arrange, and modify data source displays 444(1)-(N) and/or independent network data source display 646, one or more of data sources 102(1)-(N) or independent network data source 216 may be chosen, selected, highlighted, or the like. In some implementations, cursor controller 230 may help to provide this capability. Reference is thus made to FIG. 8, which provides an exemplary illustration of how this selection may be accomplished.

FIG. 8 again depicts display 226, in this case a single display, as well as data source displays 444(1)-(N) and independent network data source display 646. FIG. 8 also depicts a point-and-select cursor 848. Because each of the data sources 102(1)-(N) and 216 may comprise its own point-and-select cursor, point-and-select cursor 848 may comprise a "meta-cursor" for each data source cursor, in some implementations. In other words, each of the data sources 102(1)-(N) and 216 may comprise its own cursor operable by one or more cursor controllers. However, manager module 110 may provide point-and-select cursor 848, which may be configured to navigate display 226. Furthermore, cursor controller 230, such as a mouse or keyboard, may command point-andselect cursor 848. Thus, when cursor controller 230 navigates cursor 848 over a data source display, cursor 848 may then command the data source's own cursor. In some implementations, cursor 848 may thus define a "meta-cursor" for individual data source cursors.

Furthermore, point-and-select cursor 848 may serve to navigate over the output of display 226 and select one or more of a plurality of data source displays 444(1)-(N) and 646. A data source, such as the data sources 102(1)-(N) and 216, may be selected by clicking a portion of a cursor controller 230 or by merely moving cursor 848 over a certain data source display 444(1)-(N) and 646. Once selected, the user may have access to that data source (including its video and audio signals) and may also now have the ability to modify and/or arrange the data source display. As illustrated in FIG. 8, the user may select, for example, data source display 444(2) from display 226. At this point, the user may be able to place data source display 444(2) on display 226 in a desired location. Other data source displays may similarly be arranged and re-arranged. Furthermore, the user may now have the ability to change the size and/or resolution of data source display 444(2).

Continuing the example discussed immediately above, data source display 444(2) may correspond to data source 102(2), which may be performing work-related VPN operations. For example, the user may have a work-related spreadsheet open on data source 102(2). Nevertheless, the user may choose to focus on the contents of independent network data source 216 and may thus move data source display 444(2), corresponding to the spreadsheet, away from the center of display 226. Again, the user may also choose to lessen the size and possibly the resolution of the display 444(2). Other data source displays, such as the data source displays 444(1), 444(N), and 646 may likewise be selected, arranged, re-arranged, and modified.

Furthermore, selecting data source 102(2) may also serve to allow for use or modification of the data source. For example, if the user in the current example selects data source display 444(2) with point-and-select cursor 848, then the user may be able to operate on the work-related spreadsheet. Similarly, selection of another data source display, such as the data source display 444(1), 444(N), or 646, may allow for operation of the selected data source.

Figure 9:
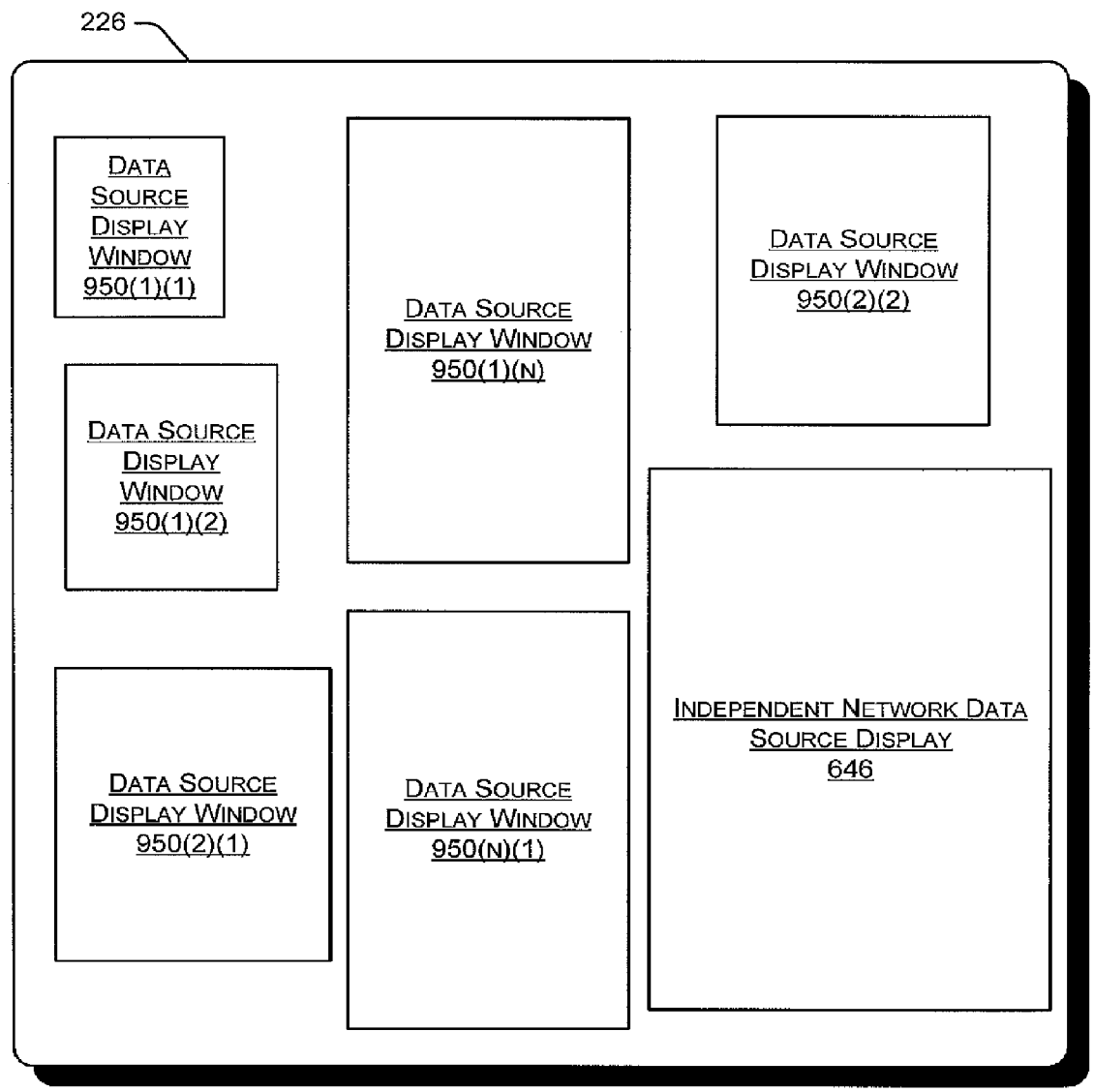
FIG. 9 is a block representation of a display device upon which a manager module may output a plurality of data source display windows from a plurality of data sources.

Referring now to FIG. 9, manager module 110 may also be configured to allow for the selection, modification, arrangement, and/or re-arrangement of data source display windows 950(1)(1)-(N)(N). These data source display windows 950(1)(1)-(N)(N) may correspond to programs or applications that may be running in each respective data source 102(1)-(N) and on each respective data source display 444(1)-(N). Thus, for example, data source display window 950(1)(1) may correspond to a first window open in data source display 444(1), which itself may correspond to data source 102(1). Likewise, data source display window 950(N)(N) may correspond to an $N^{th}$ window open on data source display 444(N), which itself may correspond to data source 102(N).

Data source display windows 950(1)(1)-(N)(N) may be modified, selected, arranged, and re-arranged in display 226 in many of the ways discussed above in regards to data source displays 444(1)-(N). For instance, once a data source 102(1)-(N) is selected, such as in the manner depicted in FIG. 7, data source display windows located within the data source displays may be used, modified, selected, arranged or re-arranged. Data source display windows 950(1)(1)-(N)(N) may also be extracted from their respective data source displays 444(1)-(N) and placed on display 226. In some implementations, the illustrated point-or-select cursor 848 may accomplish such alterations of the data source display windows 950(1)(1)-(N)(N), although other methods may also be utilized. A keyboard, for example, may also be used. In any instance, it is noted that multiple data source display windows from a single data source display may be located and viewed on display 226.

FIG. 9 depicts, for instance, data source display windows 950(1)(1), 950(1)(2), and 950(1)(N), all of which correspond to data source display 444(1), which again corresponds to data source 102(1). If, as in the example used above, data source 102(1) were used for streaming broadband entertainment, then three data source display windows 950(1)(1), 950(1)(2), and 950(1)(N) may comprise three different internet-broadcast television shows or the like. Similarly, for a work-related data source, multiple work-related data-source display windows may also be present on display 226. Volume, size control, resolution control, as well as user preferences of data source display windows 950(1)(1)-(N)(N) may be managed by manager module 110 in many of the same ways as discussed both above and below. It is specifically noted that while independent network data source display 646 is illustrated as a single display, the display 646 may possess N number of windows, which may be arranged and modified in many or all of the same ways as data source display windows 950(1)(1)-(N)(N).

Manager module 110, in conjunction with audio system 228, may be further configured to manage audio signals from data sources 102(1)-(N) and/or independent network data source 216. Sound from the multiple data sources may project in unison, singly, or in any user-chosen combination. In some implementations, the sound emanating from one data source will project from the direction of the location of the corresponding data source display. Referring back to FIG. 7, for example, sound from data source 102(1)-whose display 444(1) is located on the left-hand portion of display 226-may project from the left-hand location of audio system 228. As such, the sound may appear to be emanating from the location of the corresponding display.

Alternatively, sound may appear to originate from the direction that a user is looking. This may be accomplished by the conjunction of manager module 110, audio system 228, as well as camera 232, which may serve to notify manager module 110 of the user's current head orientation. This implementation may also be accomplished with the help of a user's chair. For instance, the direction from which sound emanates may be related to the current rotation of a user's chair.

Manager module 110 and audio system 228 may also manage sound volumes in a multitude of ways. For instance, the volume of a data source may be related—possibly directly related—to the size of the corresponding data source display. Reference is again made to FIG. 7, which depicts that data source display 444(N) is noticeably smaller than independent network data source display 646. In this implementation, if data source display 444(N) broadcasts a news station and independent network data source display 646 comprises a telepresence signal, any sound from that latter may dominate the former. Again, this may be because of the relative sizes of each respective display. Of course, in some implementations the size of these displays is user-modifiable, thus making their volumes user-modifiable as well. In these implementations, sounds from data sources may become louder when point-and-select cursor 848 covers that data source's respective display.

Furthermore, it is noted that manager module 110 may store user preferences, as discussed above. Each user may have one or more stored preference settings, which may comprise audio or video preferences, or the like. Thus, if sensor 236, which may comprise a weight-based chair sensor, recognizes User #1, then User #1's preference settings may be activated. Depending on the time of day or possibly User #1's selection, one of a plurality of different preference settings may be selected. For instance, User #1 may have a work preference setting and a recreational preference setting. In the work preference setting, display 226 may enlarge a work-related data source display and may lessen sizes and/or resolutions of others. In a recreational preference setting, all data source displays may be enlarged. If, for example, sensor detects User #1 during the daytime, then the work preference setting may be enabled. Alternatively, User #1 may choose his or her own preference setting, such as recreational. While these implementations involve automatically setting preferences, it is to be understood that preferences may also be manually configured.

Other preference settings may be default settings. For instance, when a videoconference call is received, a data source display window associated with the call may increase in size, while others may decrease in size. When such a video call is received, all other data source displays may also disappear, so as to limit the calling party's visual access to the user's data. This may be used, for example, if one or more of data source displays comprise proprietary information. Furthermore, when a video or an audio phone call is received, all other sound coming from other data sources may be muted. It is to be understood that these specific capabilities are but some non-limiting examples of possible configurations.

Finally, FIG. 10 represents an exemplary process 1000 that may be carried out with the tools described above. The process 1000 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. Operation 1002 represents receiving data including video data from a plurality of local data sources, the plurality of local data sources comprising one or more first local data sources coupled to a first network and one or more second local data sources coupled to a second network that is independent of the first network. Operation 1004, meanwhile, represents outputting a portion of the video data received from the one or more first local data sources and a portion of the video data received from the one or more second local data sources onto a single display device.

It is noted that the various modules shown herein may be implemented in hardware, software, or any combination thereof. Additionally, these modules are shown as separate items only for convenience of reference and description, and these representations do not limit possible implementations of the teachings herein. Instead, various functions described with these modules could be combined or separated as appropriate in a given implementation, without departing from the scope and spirit of the description herein.

CONCLUSION

Although techniques and devices for managing data from multiple data sources have been described in language specific to certain features and methods, it is to be understood that the features defined in the appended claims are not necessarily limited to the specific features and methods described. Rather, the specific features and methods are disclosed as illustrative forms of implementing the claimed subject matter.

What is claimed is:

1. A system comprising a processor having access to a computer readable medium storing instructions, executable by the processor, that perform a method when executed by the processor, the method comprising:
   receiving a plurality of signals including video signals from a plurality of local data sources;
   outputting the video signals onto a single display device; and
   responsive to receiving a telepresence signal from a presence sensor indicating that a user is in proximity to the system and working remotely, streaming video of the user to the user's office for presentation at the user's office.

2. The system of claim 1, wherein at least one of the plurality of local data sources is a personal computing device.

3. The system of claim 1, wherein the plurality of signals travel over a plurality of networks.

4. The system of claim 1, wherein the telepresence signal travels over an independent network.

5. The system of claim 1, wherein the method includes inputting audio signals from an audio device and outputting the audio signals to an audio system.

6. The system of claim 1, wherein the method includes receiving user input selected from audio input, visual input, and textual input, the user input being directed from at least one of a cursor controller, a camera, a microphone, and the presence sensor.

7. The system of claim 1, wherein the presence sensor is associated with a chair and wherein, responsive to the user sitting in the chair, the presence sensor detects that the user is present and a generates the telepresence signal.

8. A non-transitory computer-readable medium storing program instructions, executable by a processor, wherein the program instructions perform a method when executed by the processor, the method comprising:
   selecting, from a plurality of data source displays, each corresponding to a respective local data source and each concurrently located on a single display device, a selected data source display;
   accessing a local data source corresponding to the selected data source to allow for use of the local data source;
   receiving a telepresence signal from a presence sensor to indicate that a user is present in a vicinity of the system; and
   responsive to receiving the telepresence signal, streaming at least one of audio of the user and video of the user to the user's office for presentation at the user's office.

9. The computer-readable medium of claim 8, wherein the method includes arranging the data source displays on the single display device.

10. The computer-readable medium of claim 9, wherein the method includes arranging the data source displays on multiple display devices.

11. The computer-readable medium of claim 9, wherein arranging the data source displays includes dragging and dropping the data source displays by use of a point-and-select device.

12. The computer-readable medium of claim 8, wherein the method includes arranging data source display windows on the single display device.

13. A method, implemented at least in part by a computing device, comprising:
   receiving data including video data from a plurality of local data sources, the plurality of local data sources including a first local data source coupled to a first network and a second local data source coupled to a second network that is independent of the first network, wherein the second local data source comprises a telepresence data source;

outputting a portion of video data received from the first local data source and a portion of video data received from the second local data source to a single display device;

receiving a telepresence signal from a presence sensor indicating that a user is present in a vicinity of the second local data source; and responsive to receiving the telepresence signal, streaming video of the user to a remote location for viewing by the user's co-workers.

14. A method as described in claim 13, further comprising:
establishing a telepresence link over the second network with use of the telepresence data source.

15. A method as described in claim 14, wherein the sensor comprises a weight-sensitive chair.

16. A method as described in claim 14, wherein establishing the telepresence link includes displaying, on the single display device, streaming video from the remote location.

17. A method as described in claim 13, wherein the data received from the plurality of local data sources includes audio data, the method further comprising outputting a portion of audio data received from the first local data source and a portion of audio data received from the second local data source to an audio system.

* * * * *